March 5, 1929. E. G. CARR 1,704,382
MACHINE FOR PREPARING BASES FOR RAILS AND THE LIKE
Filed Sept. 8, 1925 4 Sheets-Sheet 2
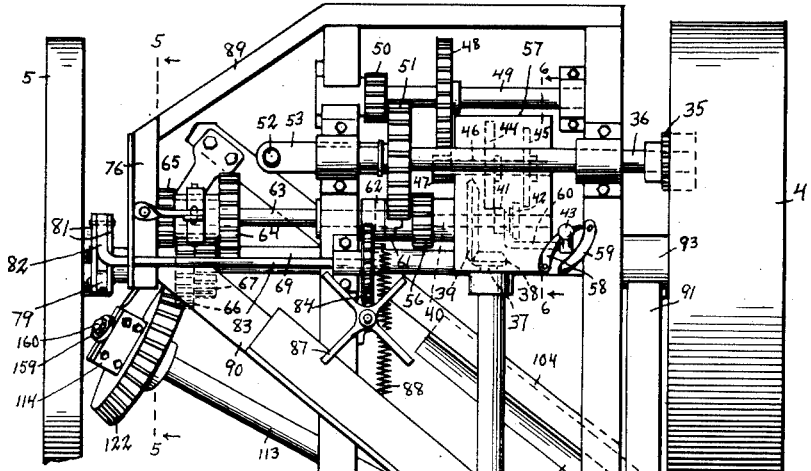
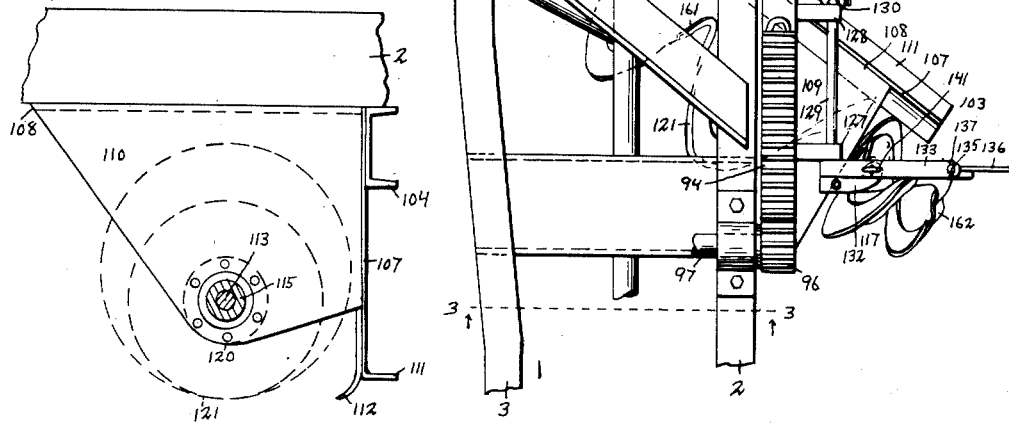
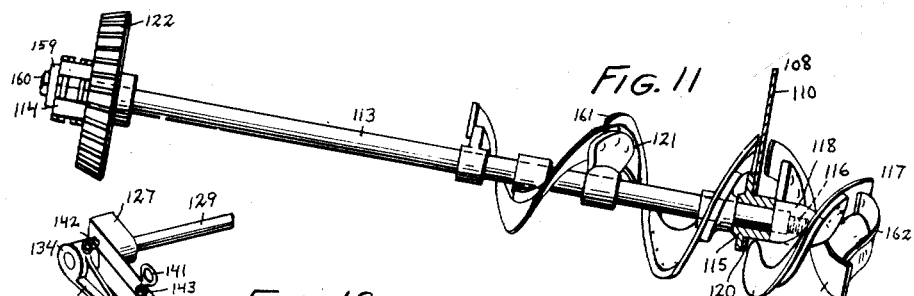
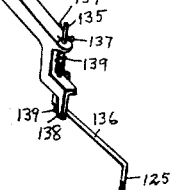

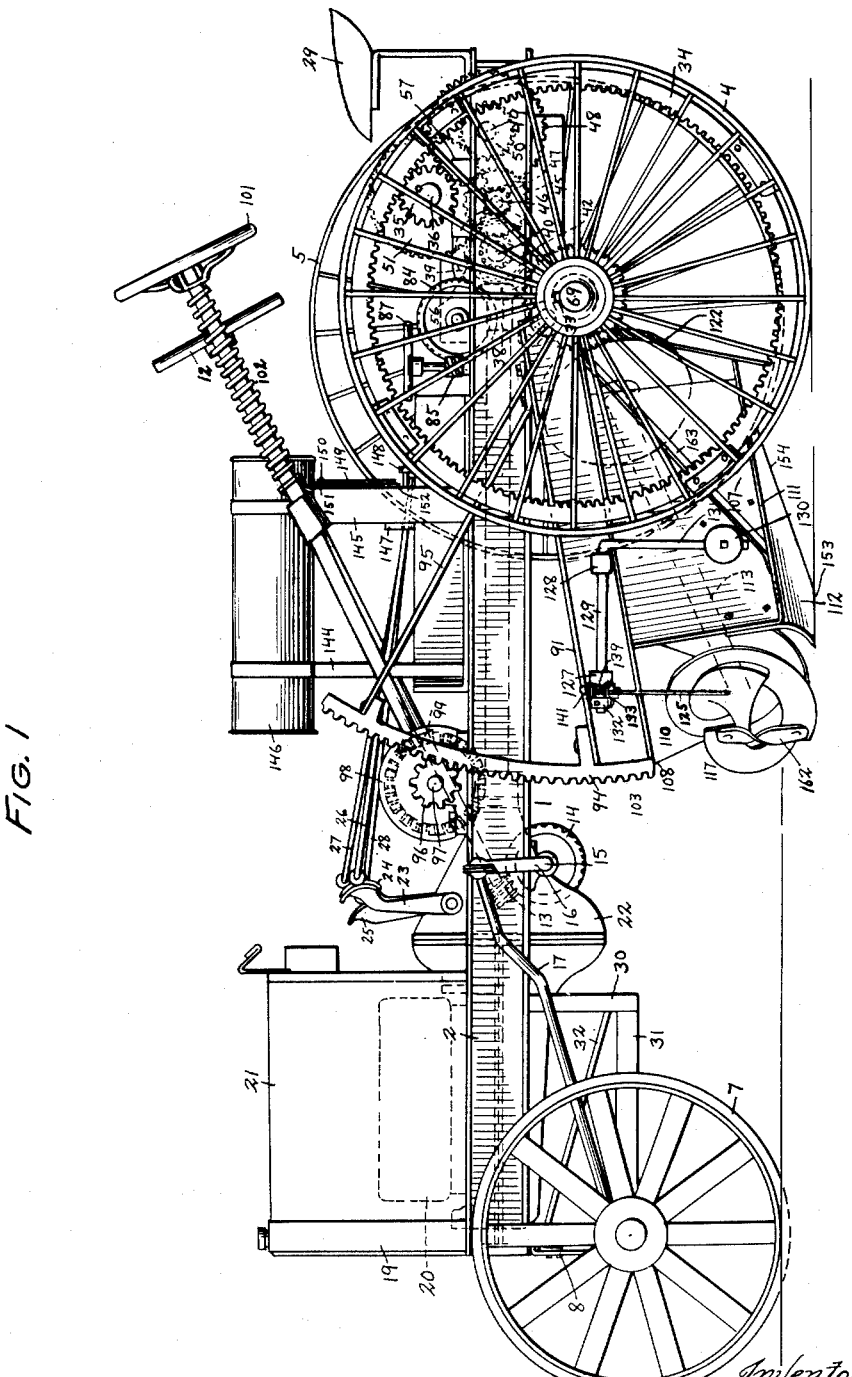

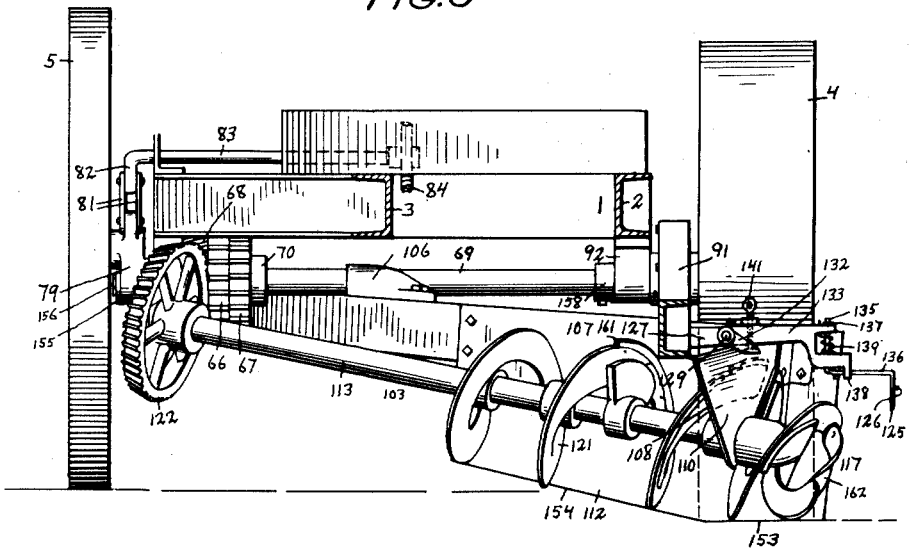
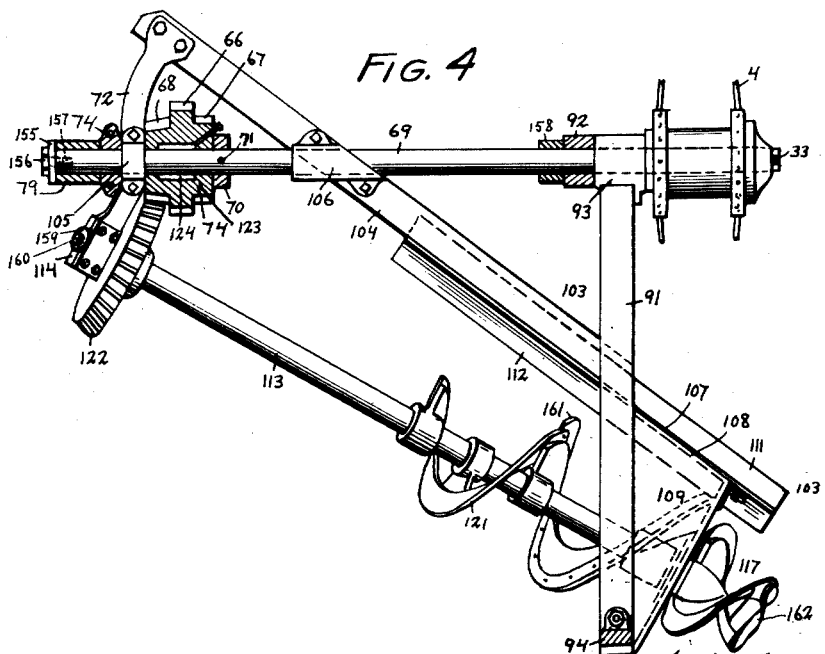

March 5, 1929.  E. G. CARR  1,704,382
MACHINE FOR PREPARING BASES FOR RAILS AND THE LIKE
Filed Sept. 8, 1925  4 Sheets-Sheet 4
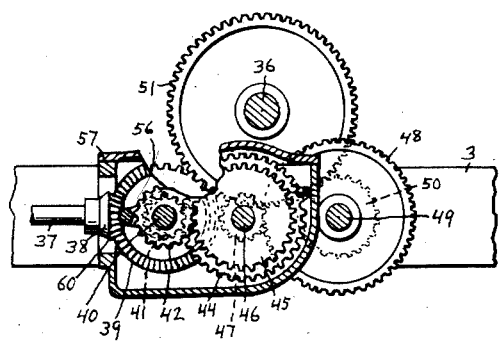
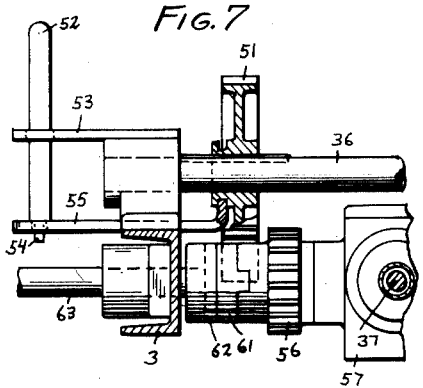
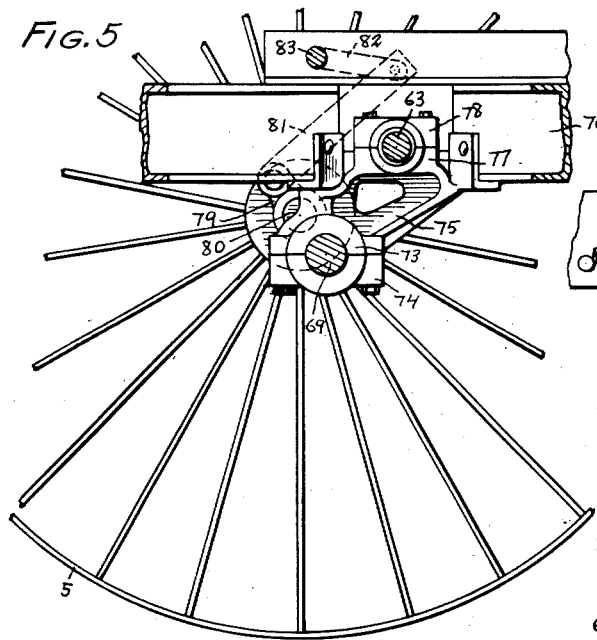
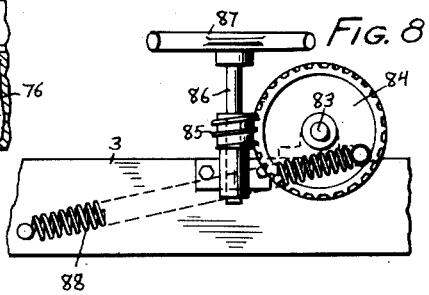
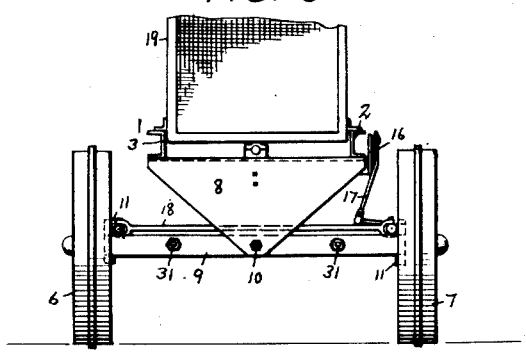
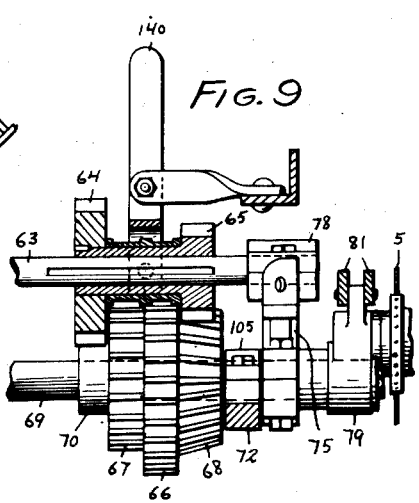
Inventor
Edward G. Carr,
By Frank E. Dennett,
Atty Patented Mar. 5, 1929.

1,704,382

UNITED STATES PATENT OFFICE.

EDWARD G. CARR, OF CHICAGO, ILLINOIS.

MACHINE FOR PREPARING BASES FOR RAILS AND THE LIKE.

Application filed September 8, 1925. Serial No. 55,163.

This invention relates to machines for preparing bases for rails and the like, and the object of the invention is to improve the construction and operation of machines for preparing bases for rails and the like in the manner to be hereinafter described and claimed.

Referring to the drawings, which accompany this specification and form a part hereof, which drawings illustrate an embodiment of this invention, and on which drawings the same reference characters are used to designate the same parts in the different views, Fig. 1 is a side elevation of the machine; Fig. 2 is a plan view of part of the machine; Fig. 3 is a section, taken on the line 3—3 on Fig. 2, looking in the direction indicated by the arrows; Fig. 4 is a plan view of parts of the machine, parts being shown in section, and parts being broken away; Fig. 5 is a section, taken on the line 5—5 on Fig. 2, looking in the direction indicated by the arrows; Fig. 6 is a section, taken on the line 6—6 on Fig. 2, looking in the direction indicated by the arrows; Fig. 7 is an elevation of parts of the machine, parts being shown in section; Fig. 8 is an elevation of parts of the machine; Fig. 9 is an elevation of parts of the machine, parts being shown in section; Fig. 10 is an elevation of parts of the machine, parts being shown in section; Fig. 11 is an elevation of parts of the machine, parts being shown in section; Fig. 12 is a perspective view of parts of the machine; and Fig. 13 is an elevation of parts of the machine.

Referring to the drawings, the reference numeral 1 designates, generally, a frame which is composed of the side members 2 and 3 and suitable cross and bracing members. The frame 1 may be supported in any suitable manner for the work to be accomplished by the machine and the drawings illustrate the frame 1 as supported upon suitable and conventional supports composed of ordinary circular wheels. A circular wheel support construction is illustrated by the drawings and will not be described in this specification for the reason that such a construction is simple, readily understood, and is sufficient in actual operation, but it will be readily understood that changes can be made in the specific mechanisms illustrated by the drawings and described by this specification without changing the principles of construction and operation of the machine.

The plate 8 is pivoted to the front axle 9 by a bolt 10 so that the tipping of the front axle 9 does not tend to tip or tilt the frame 1. The front wheels 6 and 7 are connected with the front axle 9 by ordinary forms of steering knuckles 11, and the machine is steered by the steering wheel 12, the worm 13, the worm wheel 14, the shaft 15, the crank 16, the rod 17, which is connected with one steering knuckle, and the rod 18, which connects the two steering knuckles.

The frame 1 supports a radiator 19, an internal combustion motor 20, a hood 21, and transmission mechanism. The drawings illustrate the internal combustion motor 20 as a Ford motor which is provided with the ordinary planetary transmission mechanism within the transmission case 22, and all parts not necessary to a complete understanding of this invention are omitted from the drawings for the sake of simplicity and clearness of illustration and description. The clutch pedal 23, the reverse pedal 24, and the brake pedal 25, are, respectively, provided with extension rods 26, 27 and 28 so that the respective pedals may be actuated by the feet of an operator when seated in the seat 29.

A brace 30 extends downwardly from the frame 1 to receive the thrust of the radius rods 31, and the lower end of the brace 30 is anchored to the plate 8 by a tie rod 32.

The traction wheel 4 is rotatable upon a rear axle, to be hereinafter described and may be retained thereon by a pin 33. The traction wheel 4 is provided with a gear 34 which is rotated by a pinion 35 secured to a shaft 36. The propeller shaft 37 is provided with a bevel gear 38 which meshes with a bevel gear 39 secured to a shaft 40. The shaft 40 has the connected gears 41 and 42 splined, or otherwise secured thereto so as to be compelled to rotate therewith while being movable longitudinally thereof, and these gears may be moved by the gear shift 43 so that the gear 41 will engage with the gear 44, or so that the gear 42 will engage with the gear 45, or so that the gears 41 and 42 will not engage the gears 44 and 45, as clearly shown by Fig. 2 of the drawings. The gear 41 is smaller than the gear 42 and the relationship between the sizes of the gears 41 and 44 and the gears 42 and 45 is such as to produce the speed changes desired. The gears 44 and 45 are secured to a shaft 46 to which is also secured a pinion 47 which meshes with a gear 48 secured to a shaft 49 which also has a pinion 50 secured thereto. The shaft 36 has a gear 51 splined thereto, or otherwise connected therewith, so as to rotate with the shaft 36 while being movable longitudinally thereof. A shifting rod 52 passes through a plate 53 which is secured to the frame of the machine and is provided with a reduced lower end 54 which enters a hole in a suitably guided shifting member 55 by means of which the gear 51 may be shifted into engagement with the pinion 50 or can be disengaged therefrom. From the foregoing description it will be readily understood that the traction wheel 4 can be rotated to propel the machine in a forward direction at different speeds by engaging the gear 41 with the gear 44 or the gear 42 with the gear 45, assuming that the gear 51 has been moved into mesh with the pinion 50, regardless of the changes or variations of speed which can be produced by controlling the motor 20. A pinion 56 is also secured to the shaft 40 and the extent of movement of the gear 51 on its shaft 36 is sufficient so that the gear 51 can be engaged either with the pinion 50 or with the pinion 56 or can be disengaged from both of said pinions so as to occupy a neutral or inactive position, as clearly shown by Figure 2 of the drawings. When the gear 51 is engaged or meshed with the pinion 56, the traction wheel 4 will be revolved at a different speed than when engaged with the pinion 50, so that there is a distinction between the working speed and the traveling speed of the vehicle. A speed of say one-tenth mile per hour may be maintained as a working speed for the machine when the gear 51 is in mesh with the pinion 50, but such a slow rate of speed would not be sufficient for traveling purposes, that is to say, for moving the machine from place to place so that when the gear 51 is in mesh with the pinion 56 the traveling speed of the machine is increased to say three miles per hour.

The bevel gear 39 and the gears 41, 42, 44 and 45 are illustrated as enclosed in a gear case 57 which can be filled with grease or other lubricant as is the custom in automotive vehicle practice. The reference numerals 58 and 59 designate a couple of members secured to the machine to act as cams to produce a transverse movement of the shifting rod 60 when the gear shifter 43 is turned forward or back. The hub of the pinion 56 is illustrated by the drawings as connected by a flexible coupling member 61 with a coacting member 62 secured to a shaft 63. The shaft 63 has the connected gears 64 and 65 splined or otherwise secured thereto so that they are compelled to rotate with the shaft 63 while being movable longitudinally thereon. Spur gears 66 and 67 and a bevel gear 68 are rotatably mounted upon the rear axle 69 and are retained from movement longitudinally thereon by a collar 70, with a pin 71, and a bracket 72 which is prevented from outward movement by a bearing 73 for the rear axle 69. A cap 74 is provided to retain the rear axle 69 in place in the bearing 73. The bearing 73 is illustrated by the drawings as part of a casting 75 which is secured to an outrigger 76. The casting 75 is provided with a bearing 77 for the shaft 63 and the shaft is retained in the bearing 75 by the cap 78. A crank 79 is loose upon the rear axle 69 outside of the casting 75 and is provided with a fixed spindle 80 for the leveling wheel 5, and is pivotally connected by links 81 with a crank 82 upon a shaft 83 which is provided with a worm wheel 84 meshing with a worm 85 upon an upright spindle 86 which can be turned by a hand wheel 87. A spring 88 is secured to the side member 3 of the frame 1 and to the worm wheel 84 in such a manner as to tend to rotate the wheel 84, the shaft 83, the crank 82, and the crank 79, in a direction to raise the side of the machine with respect to the spindle 80, it being understood that the leveling wheel 5 serves as the fulcrum for the crank lever 79 for raising and lowering the side of the frame 1.

The outrigger 76 is simply a mechanical expedient for widening the frame 1 between the traction wheel 4 and the leveling wheel 5 to reduce in degree the angle of tilt or tip which might be imparted to the rear end of the machine, and to provide an additional support for parts of the machine. The outrigger 76 is securely connected with the frame 1 of the machine by suitable frame members which are designated by the reference characters 89 and 90.

An arm 91 is located outside of the side member 2 of the frame 1 and extends in the direction of movement of the machine when the machine is traveling in a straight line. This arm 91 is pivotally mounted upon the rear axle. The reference numeral 92 designates a bearing for the rear axle 69, and the reference numeral 93 designates a casting clamped upon the rear axle 69 and to which the arm 91 is connected. A curved rack 94 is secured to the forward, free end of the arm 91 and may be braced by one or more braces 95. The curvature of the curved rack 94 is the curvature of an arc of a circle struck from the axis of the rear axle 69 so that the curved rack 94 will mesh with a pinion 96 which is secured to a shaft 97. The shaft 97 is suitably supported upon the frame of the machine and is provided with a bevel gear 98 with which a bevel gear 99 meshes. The bevel gear 99 is fixed to a suitably supported shaft 100 which is provided with a hand wheel 101. It will now be apparent that the arm 91 can be raised or lowered by rotating the hand wheel 101 in the proper direction. A spring may be provided to partly support or counterbalance the weight of the arm 91 and its associated parts so that the operator can move the arm 91 up and down with less exertion than would be necessary, without some counterbalancing means. The drawings illustrate a long spiral spring 102 surrounding the shaft 100 and connected at one end to the hand wheel 101 and with its other end connected to a part of the machine, in such a manner that rotation of the hand wheel 101 in a direction to lower the arm 91 will cause the spring to be wound up or put under tension. It will be readily recognized that the spring 88 connected with the worm wheel 84 and the side member 3 of the frame 1 is, in general principles, the same kind of a spring counter-balancing means as here just described for the spring 102, both of the springs 88 and 102 being intended to counterbalance weights of vertically movable parts of the machine.

The arm 91 forms a part of a swinging frame which is designated generally by the reference numeral 103, and which also includes the rear axle 69, the bracket 72 and the diagonal brace member 104. The bracket 72 is securely clamped upon the rear axle 69 by the cap 105, and the diagonal brace member 104 is securely clamped upon the rear axle 69 by the cap 106. This construction affords a very stiff and rigid construction for the swinging frame 103 on account of the generally triangular relationship of the parts. It will be understood, of course, that the rear axle 69 can rock in the hub of the traction wheel 4, as well as in the bearing 92, the bearing 73, and the crank 79, and that the rocking of the rear axle 69 does not affect the spur gears 66 and 67 and the bevel gear 68 which are loose thereon. An apron 107 is illustrated by the drawings as secured to the diagonal brace member 104 and to the arm 91 by the brace 108. The brace 108 may be bent from a suitable piece of sheet metal so as to have a top 109 and a side 110. The brace 108 can be secured to the apron and the arm 91 in any suitable or preferred manner. The lower edge of the apron is preferably stiffened and this may be readily done by bending a rearwardly extending flange 111 from the metal of the apron itself. A detachable, forwardly curved, under-cutting scraper 112 is provided in front of the traction wheel 4 to remove any loose material to a predetermined grade. A shaft 113 is journaled at one end in a bearing 114 on the bracket 72 and is journaled at its other end in a bearing 115 secured to the side 110 of the brace 108. This shaft 113 is preferably provided with a screw threaded free end 116 outside of the bearing 115 and the side 110 of the brace 108 to receive a cutter 117. This cutter 117 may be constructed in any suitable manner but is illustrated by the drawings as constructed with a screw threaded hub 118 to which are secured a plurality of spiral cutting blades 119, the spirals on the forward or cutting side extending downwardly and inwardly so as to carry material cut by the cutting blades in, towards and under the lower edge 120 of the side 110 of the brace 108 where the material can be acted upon by a cutter and conveyor 121 to move the material towards the center of the machine or the center of a road upon which the machine is operating. It will be noted, from an inspection of Fig. 3 of the drawings, that, when the arm 91 is lowered, the screw threaded end 116 of the shaft 113 is lower than the other end of the said shaft. The shaft 113 is provided with a bevel gear 122, which always meshes with the bevel gear 68. It will now be apparent that the swinging frame 103 can be swung up or down by means of the hand wheel 101, about an axis coinciding with the axis of the rear axle 69, as bevel gear 122 can roll upon the bevel gear 68, and the cutter 117 can be raised or lowered according to the requirements of the cut being made, or can be lifted out of the way while the machine is being transported. It will also be apparent that a lowering of the swinging frame 103 will lower the cutter 117 to a greater extent than the bearing 114 for the shaft 113, because the bearing 115 for the other end of the shaft 113 is located at a greater distance from the axis of the swinging movement than the bearing 114. A flattening, so to speak, of the cutting angle of the cutting blades 119, although the cutter illustrated by the drawings is cone-shaped in principle of construction, is thus produced which can leave a comparatively level bottom to the cut, while the cutter is skewed into the material to be cut in the most advantageous position to cut the material and transfer it towards and under the lower edge 120 of the brace 108 where it can be acted upon by the cutter and conveyor 121. On account of the angle which the shaft 113 makes with the direction of movement of the machine, the cutter 117 can act on the principle of a dull wood auger which is swung at an angle, when boring shallow holes, to force the lips of the auger to bite into the wood.

I have illustrated the spur gears 66 and 67 and the bevel gear 68 as formed from an integral piece of metal 123 for the reason that a large reservoir 124 can be provided for lubricant, but this construction of these gears is not essential to the principles of construction and operation of the machine, and it will be readily understood that various changes can be made, in the specific mechanisms which I have illustrated by the drawings and described in this specification, while retaining the principles of construction and operation of the machine.

The construction and operation of the machine will, it is believed, be completely and thoroughly understood from the foregoing descriptions of the construction and operation of the machine.

The motor 20 will be controlled in the well-known manner. Excessive tilting of the machine sideways can be avoided by elevating or depressing the side of the machine, which may be called the offside of the machine, with respect to the leveling wheel 5 by means of the hand wheel 87. The machine can be steered by the steering wheel 12. The cutter 117 can be raised or lowered by means of the hand wheel 101, and an important point to be observed in the construction of the machine is to have the permissible movements of the cutter 117 sufficient so that the cutter can be depressed below the bottom of the traction wheel 4 and elevated above the bottom of the traction wheel 4, for the reason that the cutter 117 is intended to cut a base to a predetermined grade regardless of the vertical movements of the front end of the frame in passing over irregularities of the surface of the ground or in passing over objects on the surface of the ground. Assuming that the traction wheel 4 is traveling over a base cut by the cutter to a predetermined grade, the cutter would be elevated or depressed in accordance with the elevation or depression of the front end of the frame 1 of the machine. It will be readily understood that the operator can manipulate the cutter by turning the hand wheel 101 so as to keep the cutter 117 cutting at the predetermined grade. It will also be readily understood that, when a change from one grade line to another grade line is to be made, the operator can depress or elevate the cutter 117 to effect the change in grade. The traction wheel 4 travels on the base cut by the cutter 117 and the lower side of the traction wheel 4 may be considered as a reference plane for the predetermination of the position of the cutter 117. A variation in the position of the cutter to a point below the bottom of the traction wheel 4 or a point above the bottom of the traction wheel 4 should, theoretically, occur only at the point of a change in the grade of the base.

The base to be cut is an invisible and intangible thing but can be referred to any kind of a suitable templet or guide and the position of the cutter 117 can be maintained in its proper position, or can be changed from one predetermined position to another predetermined position, by reference to a suitable templet. A tightly stretched cord or wire, which may be supported by stakes or in any other manner, forms a convenient templet for the purpose of a reference line. An indicator 125 is secured to the swinging frame 103 and the position of the cutter 117, vertically, with respect to the templet 126 is made visible to the operator by the indicator 125. I prefer to use an indicator which is automatically maintained in a substantially vertical plane parallel with the direction of motion of the machine as such an indicator does not tend to displace the templet when a cord or wire is used for the templet. The reference numerals 127 and 128 designate bearings secured to the arm 91 and which support a shaft 129 in a substantially horizontal position when the cutter is in a cutting position. The shaft 129 is provided with a weight 130 at the lower end of a depending arm 131 and a crank 132 is secured to the shaft 129 and extends outwardly therefrom. It will be observed that, while this construction compels the shaft 129 to move up and down with the up and down movements of the arm 91, the weight 130 prevents sidewise tipping or tilting of the machine from causing the shaft 129 to be rocked by such tilting or tipping movements. An arm 133, is pivoted upon the shaft 129 between the bearing 127 and the hub 134 of the crank 132 so that the arm 133 may be turned up out of the way to protect the indicator 125 from damage when the machine is not being used. The indicator 125 may be provided with any suitable mark to indicate the relationship of the cutter 117 to the templet 126. A convenient and suitable means for marking the indicator is to have parts of it painted or colored with contrasting colors and to use the division line between the colors as the indicator mark. I prefer to have the indicator 125 drag along in easy contact with the templet so that the mark on the indicator can be readily observed with respect to the templet without any effect of parallex due to the position of the operator when seated on the seat 29. The indicator 125 is preferably held at a distance from the side of the machine, as clearly shown by Figs. 2 and 3 of the drawings and may be formed of a piece of heavy wire which is bent to form a vertical pintle 135, a horizontal extension 136 and the vertical indicator 125. The pintle 135 is passed through holes in projections on the arm 133 and may be maintained in position by a cotter pin 137 passing through a hole in the pintle above the arm 133. The arm 133 is provided with a downwardly extending projection 138 to limit the forward swing of the indicator and a spiral spring 139, of small diameter wire so as to exert only a light tension, surrounds the pintle 135 and engages against the arm 133 at its upper end and the extension 136 at its lower end so that the extension 136 and the indicator 125 can be swung backwardly against the tension of the spring 139 to permit the indicator 125 to drag a trifle to the rear along the templet 126, as will be clearly understood from an inspection of Figs. 2 and 3 of the drawings. The projection 138 is simply a stop to prevent the spring 139 from moving the extension 136 and the indicator 125 forward of a position at substantially right angles with the arm 91 and the shaft 129.

The reference numeral 140 designates a shifting lever for the connected gears 64 and 65 and any suitable means, not shown, may be provided for holding this shifting lever 140 and the connected gears 64 and 65 in any one of their several positions.

The reference numeral 141 designates a screw threaded eye-bolt which screws through a screw threaded aperture in the arm 133 and bears against a part of the crank 132 so that the indicator 125 may be adjusted more easily to a vertical position than by changing the position of the crank 132 on the shaft 129 by loosening and tightening the set screw 142. A lock nut 143 is screwed on the eye-bolt 141 to prevent the eye-bolt from changing its position as the result of jars or vibrations.

The reference numerals 144 and 145 designates the supporting frames for the fuel or gasoline tank 146, and the frame 145 is illustrated by Fig. 1 of the drawings as provided with a plate 147 which is provided with holes for the passage of the extension rods 26, 27 and 28 which are provided with enlargements on their ends to be pressed upon by a foot of the operator. These enlargements are in line with each other, when looking at Fig. 1 of the drawings, and only one of them can be seen, the one attached to the extension rod 26 which is designated by the reference numeral 148.

An indicator or pendulum 149 is freely supported by a pivot 150 from a cross member 151 and its lower end is opposite a scale member 152 so that tipping or tilting of the main frame 1 of the machine may be readily observed by an operator seated in the seat 29 and can be corrected by means of the hand wheel 87.

The scraper 112 is illustrated by the drawings as being substantially parallel with the face of the traction wheel 4 for a little more than the width of the traction wheel 4 as indicated by the reference numeral 153 and is inclined inwardly and upwardly, as indicated by the reference numeral 154, so that the lower edge of the scraper designated by the reference numeral 153 is substantially in the plane of the bottom of an envelope of the cutter 117, while the lower edge 154 of the scraper is substantially in the plane of an envelope of the cutter and conveyor 121, as it is preferred that the scraper 112 shall do very little cutting, if any.

The crank 79 may be loosely retained upon the rear axle 69 by a washer 155 and a bolt 156 which screws into a screw threaded aperture 157 in the end of the rear axle 69. A collar 158 is secured to the rear axle 69 on the opposite side of the bearing 92 from the casting 93 and this collar 158 and the casting 93, which is clamped to the rear axle 69, prevent endwise movements of the rear axle 69 with respect to the frame 1 of the machine. The pull of the shaft 113, when the cutter 117 and the cutter and conveyor 121 are at work may be resisted by any suitable or preferred thrust member or members. The drawings illustrate a thrust washer 159 which bears against the bearing 114 and is retained in place by a bolt 160 which is screwed into a screw threaded aperture in the end of the shaft 113. The cutter and conveyor 121 may be provided with a removable cutting blade 161 for a part of its length, at least, to cut material inside of the path of travel of the cutter 117 and the blades of the cutter 117 may be provided with a root cutter 162, if desired.

The reference numeral 163 designates a brace extending from the arm 91 to the rearwardly extending flange 111 of the apron 107 to prevent the possibility of the apron 107 and the under-cutting scraper 112 from being bent or being sprung back out of position if hard soil conditions are encountered.

The indicator 125 is intended to be set vertically so that it can move up or down against a cord or wire templet 126 without depressing the templet and without elevating the templet. A sideways movement of a cord or wire templet 126 between points of attachment to stakes for example, will not change the relation of the templet to the grade to be cut and the backward swing of the indicator 125, which is permitted by the spring 139, will permit the indicator 125 to be retained in contact with the templet 126 in passing stake supports for the templet as well as at points immediate of stake supports, it being understood, of course, that the machine or vehicel is steered to line either straight or curved as the case may be, regardless of sidewise movement of the grade templet 126.

What is claimed is:

1. In a machine for preparing bases for rails and the like, the combination with a vehicle frame provided with supporting members, one of said supporting members being a traction member to propel the machine, of a motor for propelling the machine through said traction member, a cutter in advance of the traction member for cutting a grade upon which said traction member can travel, said cutter being connected with a shaft extending from the cutter upwardly, rearwardly and transversely of the machine, means for rotating said cutter from said motor, and means for elevating or depressing said cutter by movements of the said shaft.

2. In a machine for preparing bases for rails and the like, the combination with a vehicle frame provided with supporting members, one of said supporting members being a traction member to propel the machine, of a motor for propelling the machine through said traction member, a swinging frame supported by the machine, and supporting a shaft extending forwardly and laterally with respect to the frame of the machine, said shaft being provided with a cutter and a conveyor to cut and convey material inwardly with respect to the machine, said cutter being located in advance of the traction member for cutting a grade upon which said traction member can travel, means for rotating said cutter from said motor, and means for elevating or depressing said cutter and the end of the shaft to which it is attached.

3. The combination with a vehicle frame provided with a front wheel support, a traction wheel, and a leveling wheel, of a forwardly and downwardly extending spiral-bladed cutter located in front of said traction wheel to cut a grade for said traction wheel, and motor mechanism for propelling the machine and for rotating the cutter.

4. In a machine for preparing bases for rails and the like comprising the combination of a main frame, a front wheel support, a traction wheel, a leveling wheel, a forwardly and downwardly extending spiral-bladed cutter located in front of said traction wheel and supported back of its cutting end, means to raise and lower said cutter, and motor actuated mechanism for propelling the machine and rotating the cutter.

5. In a machine for preparing bases for rails and the like, the combination of a main frame, a wheel support for an end of the main frame, a traction wheel, a leveling wheel, a forwardly and downwardly extending spiral-bladed cutter located in front of said traction wheel and supported back of its cutting end, means for raising and lowering said cutter, motor actuated mechanism for propelling the machine and rotating the cutter, a perpendicular indicator unaffected by sideways tilting of the machine, and means to permit the indicator to drag and press against a templet.

In witness whereof I hereto affix my signature.

EDWARD G. CARR.